United States Patent
Zhang

(10) Patent No.: US 9,195,364 B2
(45) Date of Patent: Nov. 24, 2015

(54) METHOD AND APPARATUS FOR GENERATING DYNAMIC WALLPAPER

(75) Inventor: Dongming Zhang, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 97 days.

(21) Appl. No.: 14/232,585

(22) PCT Filed: Sep. 16, 2011

(86) PCT No.: PCT/CN2011/079763
§ 371 (c)(1),
(2), (4) Date: Feb. 10, 2014

(87) PCT Pub. No.: WO2012/151826
PCT Pub. Date: Nov. 15, 2012

(65) Prior Publication Data
US 2014/0149943 A1 May 29, 2014

(30) Foreign Application Priority Data

Jul. 20, 2011 (CN) .......................... 2011 1 0203403

(51) Int. Cl.
*G06F 3/0481* (2013.01)
*G06T 13/20* (2011.01)
*G06F 3/0488* (2013.01)

(52) U.S. Cl.
CPC .......... *G06F 3/04815* (2013.01); *G06F 3/0488* (2013.01); *G06T 13/20* (2013.01); *G06T 2210/56* (2013.01)

(58) Field of Classification Search
None
See application file for complete search history.

(56) References Cited

U.S. PATENT DOCUMENTS

2003/0161014 A1* 8/2003 Tobita et al. .................. 358/537
2011/0107269 A1* 5/2011 Chiu et al. .................... 715/849

FOREIGN PATENT DOCUMENTS

| CN | 101141745 A | 3/2008 |
|---|---|---|
| CN | 101309471 A | 11/2008 |
| CN | 201196775 Y | 2/2009 |
| CN | 101477592 A | 7/2009 |
| JP | 2002279446 A | 9/2002 |
| JP | 2004362222 A | 12/2004 |
| JP | 2007110675 A | 4/2007 |

(Continued)

OTHER PUBLICATIONS

International Search Report in international application No. PCT/CN2011/079763, mailed on Apr. 12, 2012. (2 pages—see entire document).

(Continued)

*Primary Examiner* — Maurice L McDowell, Jr.
(74) *Attorney, Agent, or Firm* — Oppedahl Patent Law Firm LLC

(57) ABSTRACT

The present disclosure discloses a method and apparatus for generating a dynamic wallpaper, including: a basic visual effect control parameter is initialized and a 3D transformation parameter is set; a background and particles are rendered based on the 3D transformation parameter and the basic visual effect control parameter to generate a dynamic wallpaper; the 3D transformation parameter and the basic visual effect control parameter are updated based on a touch mode and a touch position upon detection of a user's touch action on a screen; and the background and the particles in the dynamic wallpaper are re-rendered based on the updated 3D transformation parameter and basic visual effect control parameter.

6 Claims, 5 Drawing Sheets

(56) References Cited

FOREIGN PATENT DOCUMENTS

| | | | |
|---|---|---|---|
| JP | 2007257378 A | 10/2007 |
| JP | 2009187290 A | 8/2009 |
| JP | 2010152870 A | 7/2010 |
| JP | 2011133961 A | 7/2011 |

OTHER PUBLICATIONS

English Translation of the Written Opinion of the International Search Authority in international application No. PCT/CN2011/079763, mailed on Apr. 12, 2012. (4 pages—see entire document).

Web creators Jun. 1, 2008.
Ipad Jul. 24, 2010.
Android SDK May 6, 2011.
Android 3D Live Wallpaper Particle Storm Jul. 10, 2010.
Hearts Live Wallpaper v1.3 Demo Jan. 14, 2011.
Okozo.com Free Desktop Wallpapers Particle Storm Nov. 1, 2010.
Creative Rings Wallpaper Animated Desktop Wallpapers Feb. 1, 2011.
Supplementary European Search Report in European application No. 11865226.2, mailed on Jun. 18, 2015.

* cited by examiner

METHOD AND APPARATUS FOR GENERATING DYNAMIC WALLPAPER

TECHNICAL FIELD

The present disclosure relates to the field of computers, and in particular to a method and apparatus for generating dynamic wallpaper.

BACKGROUND

At present, a graphical user operating system, in which a personalized static or dynamic wallpaper is arranged on a desktop or standby main interface by a user is generally supported, are commonly utilized in a product such as a computer, a mobile device. It has become a basic configuration for most products such as computers and mobile devices to build in a certain number of wallpapers. The dynamic wallpaper and the wallpaper with an interactive effect are more attractive than the static one, and thus having a significant effect on product image promotion and selling point increase.

SUMMARY

The present disclosure provides a method and apparatus for generating a dynamic wallpaper, so as to generate a dynamic wallpaper with a particular dynamic interactive effect.

The present disclosure provides a method for generating a dynamic wallpaper, including:

a basic visual effect control parameter is initialized, a 3D transformation parameter is set;

a background and particles are rendered based on the 3D transformation parameter and the basic visual effect control parameter to generate a dynamic wallpaper;

upon detection of a user's touch action on a screen, the 3D transformation parameter and the basic visual effect control parameter are updated based on a touch mode and a touch position; and the background and the particles in the dynamic wallpaper are re-rendered based on the updated 3D transformation parameter and basic visual effect control parameter.

The basic visual effect control parameter may include: an initial depth area, a particle attribute, and a disappearing depth area, where the particle attribute may include: a particle size, a particle emission rate, a particle emission amount, a particle motion direction, a particle location update time, a particle life cycle, and a particle appearance attribute; and the 3D transformation parameter may include: a model transformation parameter, a view transformation parameter, a projection transformation parameter, and a viewport transformation parameter.

Further, a background and particles are rendered based on the 3D transformation parameter and the basic visual effect control parameter may include:

a 3D transformation is performed on the background based on the 3D transformation parameter to acquire a 3D background and display the 3D background;

on the displayed 3D background, the particles with a motion direction and a initial rate are rendered from the initial depth area, according to the particle emission rate and the particle emission amount, based on the 3D transformation parameter and the basic visual effect control parameter; a location and an appearance of each of the particles are updated based on the particle location update time and the particle appearance attribute; the particles located at the disappearing depth area are caused to disappear; and a next round of 3D depth motion is restarted from the initial depth area for the disappeared particles.

Upon detection of a user's touch action on a screen, the 3D transformation parameter and the basic visual effect control parameter are updated based on a touch mode and a touch position, and the background and the particles in the dynamic wallpaper are re-rendered based on the updated 3D transformation parameter and basic visual effect control parameter may include:

upon detection of a user's sliding action on the screen, the 3D transformation parameter is updated based on a sliding position; and the background and the particles are re-rendered based on the updated 3D transformation parameter to change viewpoints of the background and the particles based on the sliding position.

Upon detection of a user's touch action on a screen, the 3D transformation parameter and the basic visual effect control parameter are updated based on a touch mode and a touch position, and the background and the particles in the dynamic wallpaper are re-rendered based on the updated 3D transformation parameter and basic visual effect control parameter may further include:

upon detection of the user's tapping action on the screen, the basic visual effect control parameter is updated, and the particles are re-rendered based on the updated basic visual effect control parameter, and each of the particles currently on the screen is caused to change its location based on a relative relation between the current location of the particle and a tapping position, such that the particles within a circle which has a certain radius and is centred at the tapping position move outwards, and the particles outside the circle move in their respective original trajectories.

Upon detection of the user's tapping action on the screen, the basic visual effect control parameter is updated, and the particles are re-rendered based on the updated basic visual effect control parameter may include:

it is detected whether there is a user's tapping action on the screen, if so, a tap parameter is acquired, and a tap mark is removed;

after the tap mark is removed or the user's tapping action on the screen is not detected, it is determined whether new particles have to be generated based on the particle emission amount, if so, new particles are generated;

it is determined whether all the particles are updated, if so, it is re-detected whether there is a user's tapping action on the screen; otherwise, each particle is updated based on the particle location update time, the particles within the circle which has a certain radius and is centred at the tapping position are determined based on the tap parameter, the basic visual effect control parameter is updated, and the particles within the circle which has a certain radius and is centred at the tapping position are caused to move outwards based on the updated basic visual effect control parameter;

it is determined whether there is any particle located in the disappearing depth area, if so, the particles located in the disappearing depth area are deleted, and it is re-determined whether all the particles are updated; otherwise, it is re-determined whether all the particles are updated directly.

The present disclosure also provides an apparatus for generating a dynamic wallpaper, including:

an initializing module configured to initialize a basic visual effect control parameter, and set a 3D transformation parameter;

a rendering module configured to render a background and particles based on the 3D transformation parameter and the basic visual effect control parameter to generate a dynamic wallpaper; and an interaction module configured to, upon detection of a user's touch action on a screen, update the 3D transformation parameter and the basic visual effect control parameter based on a touch mode and a touch position, and re-render the background and the particles in the dynamic wallpaper based on the updated 3D transformation parameter and basic visual effect control parameter.

The rendering module may be specifically configured to:

perform a 3D transformation on the background based on the 3D transformation parameter to acquire a 3D background and display the 3D background;

render from the initial depth area, on the displayed 3D background, the particles with a motion direction and a initial rate according to the particle emission rate and the particle emission amount, based on the 3D transformation parameter and the basic visual effect control parameter; update a location and an appearance of each of the particles based on the particle location update time and the particle appearance attribute; cause the particles located at the disappearing depth area to disappear; and restart, for the disappeared particles, a next round of 3D depth motion from the initial depth area.

The interaction module may be specifically configured to:

update, upon detection of a user's sliding action on the screen, the 3D transformation parameter based on a sliding position, and re-render the background and the particles based on the updated 3D transformation parameter to change viewpoints of the background and the particles based on the sliding position; and update, upon detection of the user's tapping action on the screen, the basic visual effect control parameter, re-render the particles based on the updated basic visual effect control parameter, and cause each of the particles currently on the screen to change its location based on a relative relation between the current location of the particle and a tapping position, such that the particles within a circle which has a certain radius and is centred at the tapping position move outwards, and the particles outside the circle move in their respective original trajectories.

The present disclosure has the following advantageous effect.

The method and apparatus for generating dynamic wallpaper with particular dynamic interaction effect are provided through re-rendering the background and the particles in the dynamic wallpaper based on the updated 3D transformation parameter and basic visual effect control parameter upon the detection of the user's touching action on the screen. The dynamic wallpaper generated according to the embodiments of the present disclosure can provide people with an intuitive effect of 3D depth motion particles and an interaction enjoyment, and have unique features in terms of user experience such as visual effect and interaction effect compared to existing static wallpapers and dynamic wallpapers.

DETAILED DESCRIPTION

According to various embodiments of the present disclosure, the present disclosure provides a method and apparatus for generating a dynamic wallpaper, in particular a method and apparatus for generating a dynamic wallpaper with a particular effect of 3D depth particles. Specifically, a background of a wallpaper is displayed in an initial state, and then particle elements with respective certain motion directions and initial rates are successively generated in a certain initial depth area in a 3D space based on a certain emission rate and a upper limit of emission amount, whose attributes such as locations and appearances are continuously updated over time, and thereby a 3D depth motion is implemented. When a particle moves to a boundary of the specific area, it disappears at the boundary and restarts a next round of depth motion from the initial depth area. For the interaction, when a user slides a screen left or right, the viewpoint of the whole wallpaper (the background and the particles) changes correspondingly; when the user taps the screen, the location of each of the particles within a circle which has a certain radius and is centred at a tapping position is changed based on a relative relation between the current location of the particle and the tapping position, so as to simulate a position disturbance of the particle after the tap; and the particles outside the circle are not affected by the tap event. After the processing of the tap event, each particle continues to perform the 3D depth motion based on the attribute such as the location and the appearance after processing. The dynamic wallpaper generated according to the technical solutions in the embodiments of the present disclosure has a particular effect of 3D particles, and supports user interaction.

The present disclosure is further elaborated below with reference to the accompanying drawings and the embodiments. It should be appreciated that the specific embodiments described herein are merely used to explain the present disclosure, but not to limit the present disclosure.

Method Embodiments

Figure 1:
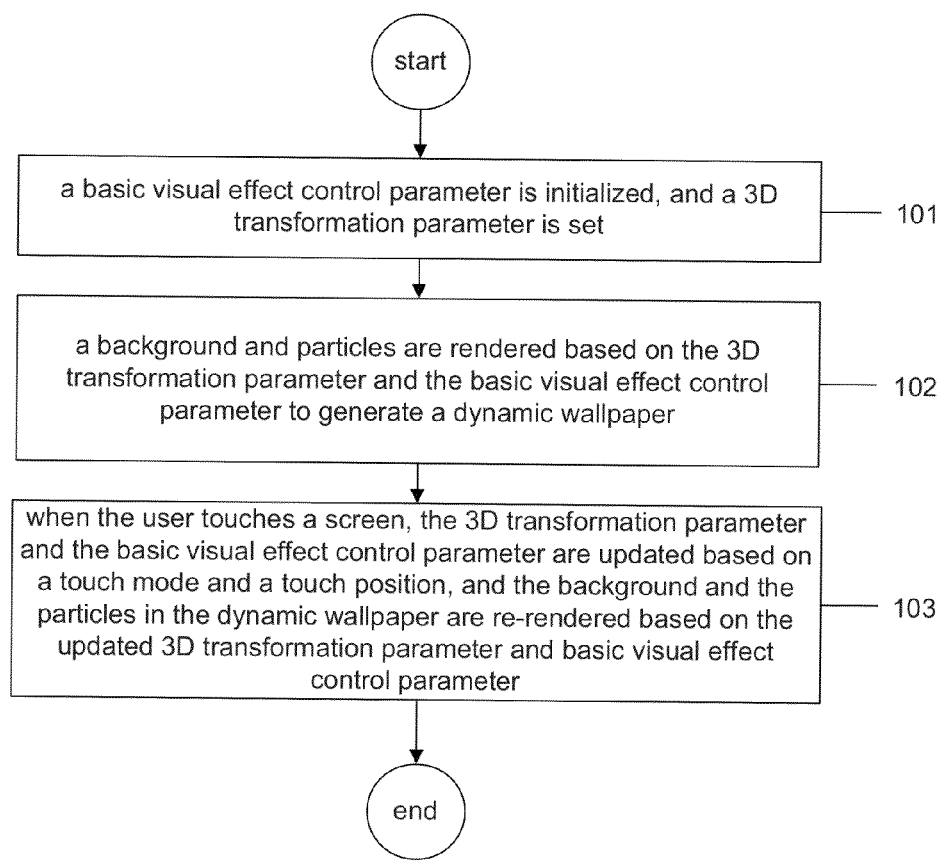
FIG. 1 is a flow chart of a method for generating a dynamic wallpaper in an embodiment of the present disclosure.

According to the embodiments of the present disclosure, a method for generating a dynamic wallpaper is provided. FIG. 1 is a flow chart of a method for generating a dynamic wallpaper in an embodiment of the present disclosure. As shown in FIG. 1, the method for generating a dynamic wallpaper according to an embodiment of the present disclosure includes the following steps.

In step 101, a basic visual effect control parameter is initialized, and a 3D transformation parameter is set;

where the basic visual effect control parameter may specifically include: an initial depth area, a particle attribute, and a disappearing depth area. The particle attribute specifically includes a particle size, a particle emission rate, a particle emission amount, a particle motion direction, a particle location update time, a particle life cycle, and a particle appearance attribute; and the 3D transformation parameter may specifically include: a model transformation parameter, a view transformation parameter, a projection transformation parameter, and a viewport transformation parameter.

In step 102, the background and the particles are rendered based on the 3D transformation parameter and the basic visual effect control parameter to generate a dynamic wallpaper;

specifically, a 3D transformation is performed on the background based on the 3D transformation parameter to acquire a 3D background and display the 3D background;

the particles with a motion direction and a initial rate is rendered from the initial depth area, on the displayed 3D background, according to the particle emission rate and the particle emission amount, based on the 3D transformation parameter and the basic visual effect control parameter; a location and an appearance of the particles is updated based on the particle location update time and the particle appearance attribute; the particles located at the disappearing depth area is caused to disappear, and thus the 3D depth motion of the particles is implemented; and a next round of 3D depth motion is restarted from the initial depth area for the disappeared particles.

In step 103, when the user touches the screen, the 3D transformation parameter and the basic visual effect control parameter are updated based on a touch mode and a touch position, and the background and the particles in the dynamic wallpaper are re-rendered based on the updated 3D transformation parameter and basic visual effect control parameter.

Specifically, in step 103, when the user slides the screen, the 3D transformation parameter is updated based on a sliding position, and the background and the particles are re-rendered based on the updated 3D transformation parameter to change viewpoints of the background and the particles based on the sliding position.

When the user taps the screen, the basic visual effect control parameter is updated, the particles are re-rendered based on the updated basic visual effect control parameter, and each of the particles currently on the screen is caused to change its location based on a relative relation between the current location of the particle and a tapping position, such that the particles within a circle which has a certain radius and is centred at the tapping position move outwards, and the particles outside the circle move in their respective original trajectories.

The step that the user taps the screen specifically includes the following processing.

In step 1, it is determined whether the user taps the screen, if so, a tap parameter is acquired, a tap mark is removed, and step 2 is performed; otherwise, step 2 is performed directly;

In step 2, it is determined whether new particles have to be generated based on the particle emission amount, if so, new particles are generated and step 3 is performed; otherwise, step 3 is performed directly;

In step 3, it is determined whether all the particles are updated, if so, step 1 is performed; otherwise, each particle is updated based on the particle location update time, the particles within the circle which has a certain radius and is centred at the tapping position is determined based on the tap parameter, the basic visual effect control parameter is updated, the particle within the circle which has a certain radius and is centred at the tapping position is caused to move outwards based on the updated basic visual effect control parameter, and step 4 is performed;

In step 4, it is determined whether there is any particle located in the disappearing depth area, if so, the particles located in the disappearing depth area are deleted, and step 3 is performed; otherwise, step 3 is performed directly.

The technical solutions in the embodiments of the present disclosure are elaborated with reference to the accompanying drawings.

Figure 2:
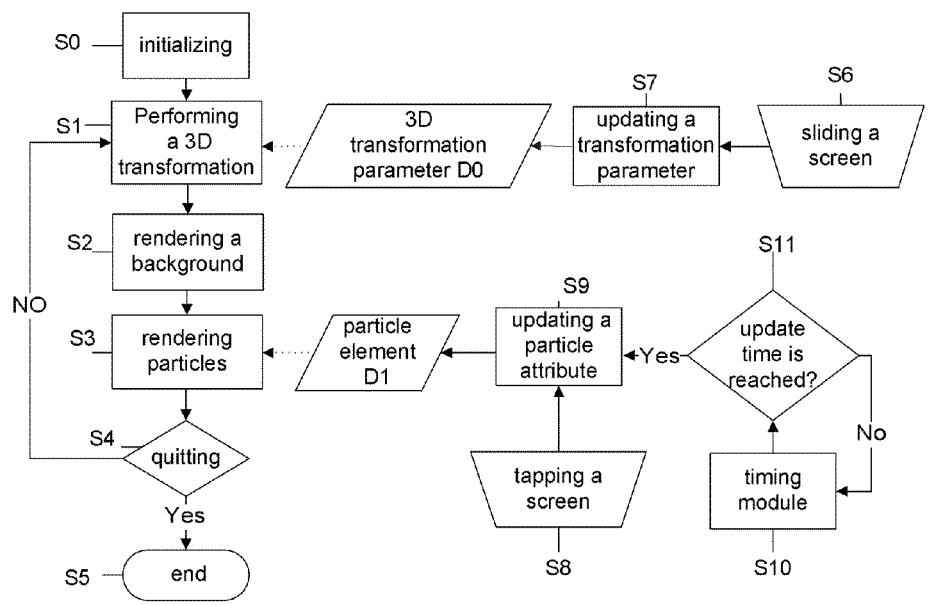
FIG. 2 is a flow chart of a detailed process of a method for generating a dynamic wallpaper in an embodiment of the present disclosure.

FIG. 2 is a flow chart of a detailed process of a method for generating a dynamic wallpaper in an embodiment of the present disclosure. As shown in FIG. 2, the method may include the following steps.

In step S0, a basic visual effect control parameter is initialized and a 3D transformation parameter is set, i.e., parameters relevant to an algorithm are initialized. The basic visual effect control parameter is irrelevant to the 3D transformation, where the basic visual effect control parameter includes, for example, an initial depth area, an particle attribute, and an disappearing depth area, and the particle attribute specifically includes a particle size, a particle emission rate, a particle emission amount, a particle motion direction, a particle location update time, a particle life cycle, and a particle appearance attribute;

In step S1, the 3D transformation is performed. In this step, the 3D display related parameters are updated such as a model transformation parameter, a view transformation parameter, a projection transformation parameter, and a viewport transformation parameter, and the 3D transformation is performed based on the current basic visual effect control parameter and 3D transformation parameter, and thus the overall display effect of the wallpaper may be changed by updating these model parameters. As shown in FIG. 2, a screen is slid by a user (step S6) to update transformation parameters (step S7), and thereby the 3D transformation parameters (D0) are updated, which are then transferred to step S1 as input parameters, and thus the user interaction effect with overall viewpoint change is implemented through the 3D transformation of step S1;

In step S2, a background is rendered. In this step, a selected background picture is drawn. In order to ensure that particle elements can be displayed, it is necessary to ensure that the background is located behind all the particles in the Z-coordinate depth direction;

In step S3, the particles are rendered. In this step, the currently generated particles are drawn. At a certain moment, a certain amount of particles have different location attributes and appearance attributes, the update of which are controlled in steps S8, S9, S10 and S11, and in this step the particles are drawn based merely on the current attribute of each particle and related overall parameters;

In step S4, quitting and determining. In this step, it is determined to perform a next round of the rendering loop or quit the operation. If another wallpaper is set by the user or the operating system is powered off, step S5 is performed; otherwise, step S1 is returned to and a next round of the rendering loop is performed;

In step S5, ending operations such as resource release are completed.

Steps S0 to S5 provide main processes for generating the dynamic wallpaper in the embodiments of the present disclosure. An interaction process and a particle updating process are introduced below.

Figure 3A:
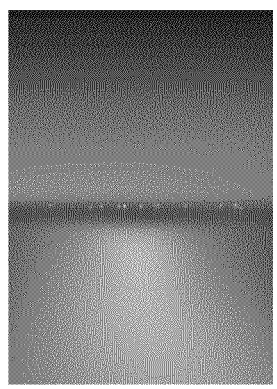
FIG. 3a is a schematic diagram illustrating an initial background of a dynamic wallpaper in an embodiment of the present disclosure.
Figure 3B:
FIG. 3b is a schematic diagram illustrating a dynamic wallpaper without a user's touch action in an embodiment of the present disclosure.
Figure 3C:
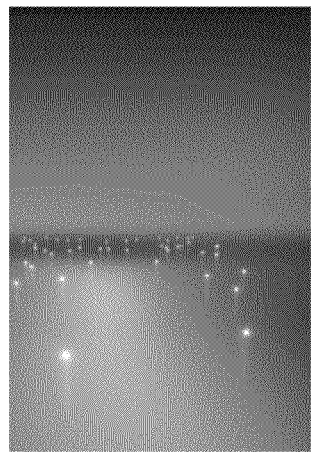
FIG. 3c is a schematic diagram illustrating a dynamic wallpaper with a user's touch action in an embodiment of the present disclosure.

Steps S6 and S7 correspond to the interaction process that the user slides the screen. When the user slides the screen left or right, the 3D transformation parameter (D0) is updated, and the rendering steps are performed through step S1 based on the updated 3D transformation parameter. This will change viewpoints of the background and the particle elements in the scene. FIG. 3a is a schematic diagram illustrating an initial background of a dynamic wallpaper in an embodiment of the present disclosure, FIG. 3b is a schematic diagram illustrating a dynamic wallpaper without a user's touch action in an embodiment of the present disclosure, and FIG. 3c is a schematic diagram illustrating a dynamic wallpaper with a user's touch action in an embodiment of the present disclosure. As shown in FIGS. 3b and 3c, when the screen is slid by the user, a translational effect appears for the viewpoint. A right translation appears for the viewpoint in the scene in FIG. 3c compared to that in FIG. 3b.

As shown in FIG. 2, steps S8 and S9 correspond to the interaction process of a tapping action:

in step S8, the user taps the screen;

in step S9, the particle attribute is updated;

steps S10 and S11 correspond to the particle updating process over time:

in step S10, timing is performed by a timing module;

in step S11, it is determined whether the update time is reached based on the timing result of the timing module, if so, step S9 is performed; otherwise, step S10 is returned to.

Steps S8 and S9 correspond to the interaction process of the tapping action, steps S10 and S11 correspond to the particle updating process over time, and the parameters updated in both of these two branch processes are input to step S9 to implement a particle attribute updating process. Step S9 is a core part to implement the dynamic effect of the particles, in which attribute update and life cycle of each of the particles are controlled. Step S8 is mainly used to implement a disturbance on the attribute (such as the particle location) in an area near a tapping position based on the user's tapping action on the screen, so as to achieve the interaction effect. The coordinate and the tap mark after the tapping action in step S8 are provided to step S9 as input parameters. Steps S10, S11 are mainly used to implement the update of the time parameter, and input the updated time parameter to step S9.

Figure 4:
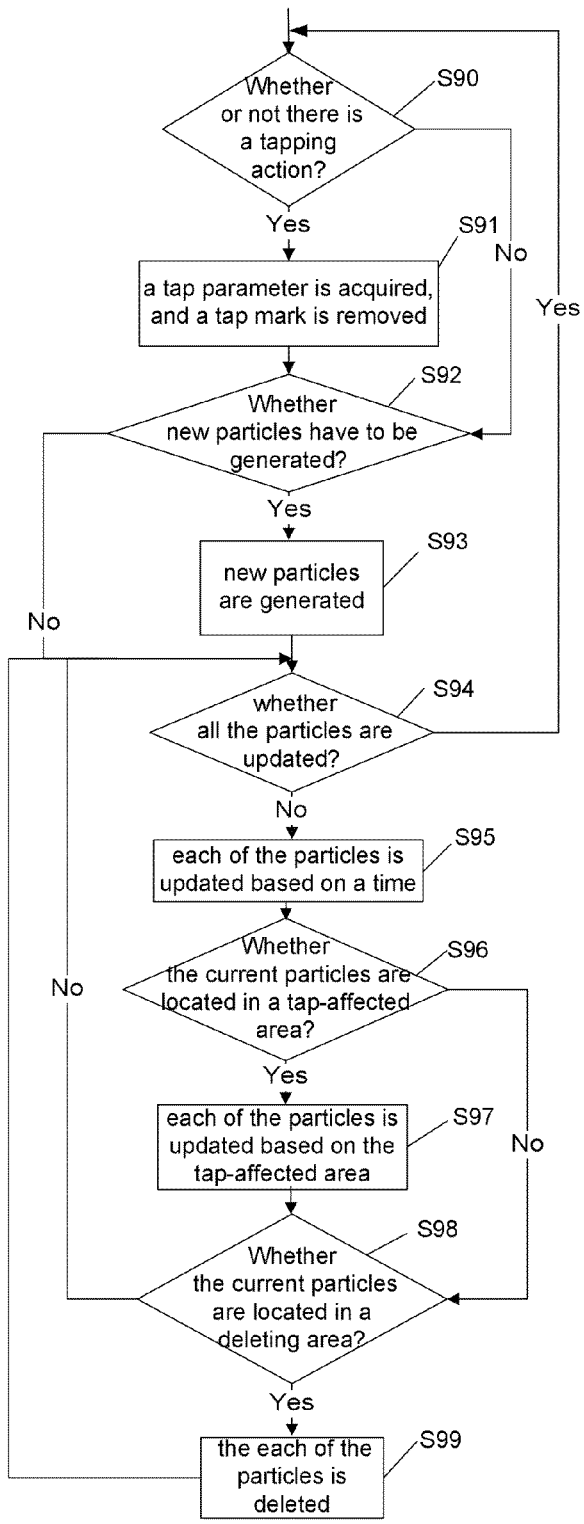
FIG. 4 is a flow chart of updating a particle attribute in an embodiment of the present disclosure.

Step S9, which is the core part to implement the dynamic effect of the particles, is elaborated below. FIG. 4 is a flow chart of updating a particle attribute in an embodiment of the present disclosure. As shown in FIG. 4, the following processing is included.

In step S90, it is detected whether or not there is a tapping action on the screen, if so, step S91 is performed; otherwise, step S92 is performed;

in step S91, upon detection of the tapping action on the screen, a tap parameter is acquired, and a tap mark is removed, so as to prevent from repeatedly reading the next time;

in step S92, it is determined whether new particles have to be generated, if so, step S93 is performed; otherwise, step S94 is performed. When the dynamic wallpaper begins to run, there is no particle in the scene, and the particles are generated successively based on a certain emission rate over time. As shown in FIGS. 3a and 3b, FIG. 3a is a state of the particle after a short while of running, and there are a relatively small amount of particles at this moment; while FIG. 3b corresponds to a scene with a relatively large amount of particles when the particle amount becomes relatively stable. In addition, even though the particle amount becomes relatively stable, the particle amount in the scene changes dynamically. When the particles move into a deleting area, the particles are deleted (see steps S98, S99), and it is also needed to maintain stability of the particle amount through the determining step in step S92 now.

In step S93, an appropriate amount of particles are generated based on the current particle amount and the emission rate;

in step S94, it is determined whether all the particles are updated, if so, step S90 is performed; otherwise, step S95 is performed;

in step S95, each of the particles is updated based on the current time and its attribute value of currently updated particle. This is the reason why the input parameters are given in the above steps S10, S11;

in step S96, it is determined whether the current particles are located in a tap-affected area based on the record of step S91, if so, step S97 is performed; otherwise, step S98 is performed.

Figure 5:
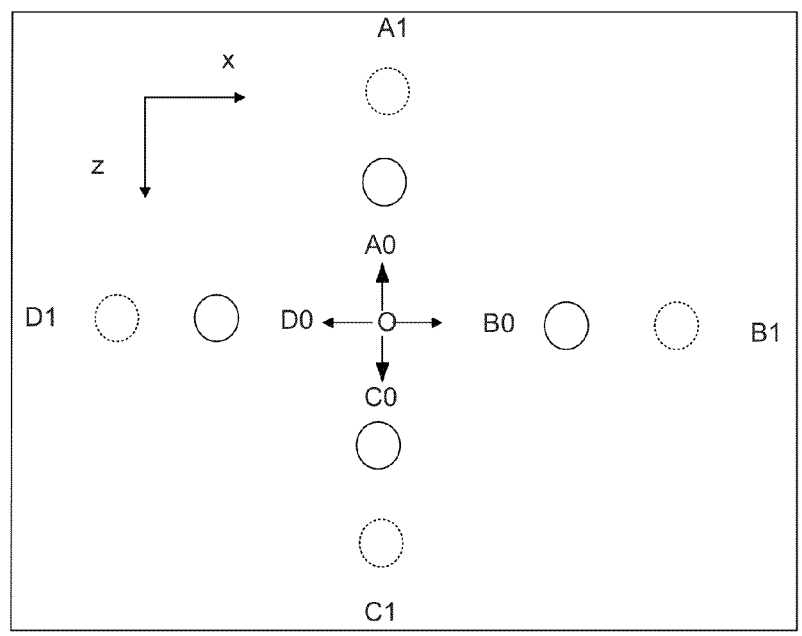
FIG. 5 is a schematic diagram illustrating a disturbance in an embodiment of the present disclosure.

In step S97, a disturbance is performed based on the current particle locations (updated locations through step S95) and the tapping position recorded by the step S91. This is the reason why the input parameters are given in the above step S8. FIG. 5 is a schematic diagram illustrating a disturbance in an embodiment of the present disclosure. As shown in FIG. 5, after the tapping action is performed on the screen, points, such as A0, B0, C0, D0, adjacent to a current tap point O (this point may be obtained by mapping from a 2D coordinate on the screen to a 3D space) spread outwards to A1, B1, C1, D1, respectively, centred at the point O.

In step S98, it is determined whether the current particles are located in the deleting area, if so, step S99 is performed; otherwise, step S94 is performed and other particles are updated.

A definition mode of the deleting area is flexible, and one mode is that: if Z coordinate of the particle in the depth direction exceeds a certain value, then it is determined the particle is located in the deleting area.

In step S99, the particles located in the deleting area are deleted, the particle amount is updated, and then step 94 is performed and other particles are updated.

The technical solutions in the embodiments of the present disclosure provide a dynamic wallpaper with particular dynamic interaction effect through re-rendering the background and the particles in the dynamic wallpaper based on the updated 3D transformation parameter and basic visual effect control parameter upon the detection of the user's touching action on the screen. The dynamic wallpaper generated according to the embodiments of the present disclosure can provide people with an intuitive effect of 3D depth motion particles and an interaction enjoyment, and have been remarkably improved on user experience such as visual effect and interaction effect compared to existing static wallpapers and dynamic wallpapers.

Apparatus Embodiments

Figure 6:
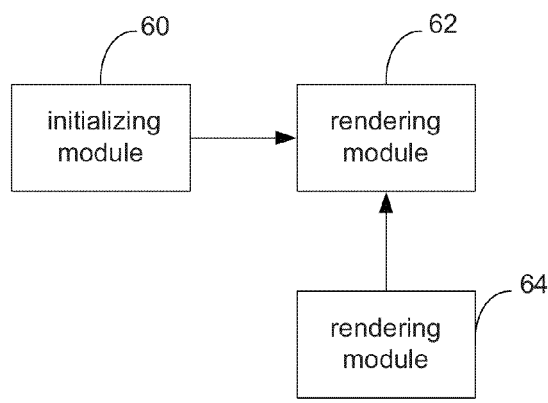
FIG. 6 is a schematic diagram illustrating a structure of an apparatus for generating a dynamic wallpaper in an embodiment of the present disclosure.

According to the embodiments of the present disclosure, an apparatus for generating a dynamic wallpaper is provided. FIG. 6 is a schematic diagram illustrating a structure of an apparatus for generating a dynamic wallpaper in an embodiment of the present disclosure. As shown in FIG. 6, the apparatus for generating a dynamic wallpaper according to an embodiment of the present disclosure includes: an initializing module 60, a rendering module 62, and an interaction module 64. Each of modules in the embodiments of the present disclosure is elaborated below.

The initializing module 60 is configured to initialize a basic visual effect control parameter and set a 3D transformation parameter;

where the basic visual effect control parameter specifically includes: an initial depth area, a particle attribute, and a disappearing depth area, and the particle attribute specifically includes: a particle size, a particle emission rate, a particle emission amount, a particle motion direction, a particle location update time, a particle life cycle, and a particle appearance attribute;

the 3D transformation parameter specifically includes: a model transformation parameter, a view transformation parameter, a projection transformation parameter, and a viewport transformation parameter.

The rendering module 62 is configured to render a background and particles based on the 3D transformation parameter and the basic visual effect control parameter to generate a dynamic wallpaper;

the rendering module 62 is specifically configured to perform a 3D transformation on the background based on the 3D transformation parameter to acquire a 3D background and display the 3D background; and render from the initial depth area, on the displayed 3D background, the particles with a motion direction and a initial rate according to the particle emission rate and the particle emission amount based on the 3D transformation parameter and the basic visual effect control parameter, update a location and an appearance of each of the particles based on the particle location update time and the particle appearance attribute, cause the particles located at the disappearing depth area to disappear to implement the 3D depth motion of the particles, and restart, for the disappeared particles, a next round of 3D depth motion from the initial depth area.

The interaction module 64 is configured to, when a user touches a screen, update the 3D transformation parameter and the basic visual effect control parameter based on a touch mode and a touch position, and re-render the background and the particles in the dynamic wallpaper based on the updated 3D transformation parameter and basic visual effect control parameter.

The interaction module 64 is specifically configured to, when the user slides the screen, update the 3D transformation parameter based on a sliding position, and re-render the background and the particles based on the updated 3D transformation parameter to change viewpoints of the background and the particles based on the sliding position. The interaction module 64 is also specifically configured to, when the user taps the screen, update the basic visual effect control parameter, re-render the particles based on the updated basic visual effect control parameter, cause each of the particles currently on the screen to change its location based on a relative relation between the current location of the particle and a tapping position, such that the particles within a circle which has a certain radius and is centred at the tapping position move outwards, and the particles outside the circle move in their respective original trajectories.

When the user taps the screen, the interaction module 64 specifically includes the following processing:

step 1, determining whether the user taps the screen, if so, acquiring a tap parameter, removing a tap mark, and performing step 2; otherwise, performing step 2 directly;

step 2, determining whether new particles have to be generated based on the particle emission amount, if so, generating new particles and performing step 3; otherwise, performing step 3 directly;

step 3, determining whether all the particles are updated, if so, performing step 1; otherwise, updating each particle based on the particle location update time, determining the particles within the circle which has a certain radius and is centred at the tapping position based on the tap parameter, updating the basic visual effect control parameter, causing the particle within the circle which has a certain radius and is centred at the tapping position to move outwards based on the updated basic visual effect control parameter, and performing step 4;

step 4, determining whether there is any particle located in the disappearing depth area, if so, deleting the particles located in the disappearing depth area, and performing step 3; otherwise, performing step 3 directly.

The technical solutions in the embodiments of the present disclosure are elaborated below with reference to the accompanying drawings.

As shown in FIG. 2, the following processing is included.

In step S0, the initializing module 60 initializes a basic visual effect control parameter and sets a 3D transformation parameter, i.e., parameters relevant to an algorithm are initialized. The basic visual effect control parameter is irrelevant to the 3D transformation, where the basic visual effect control parameter includes, for example, an initial depth area, an particle attribute, and an disappearing depth area, and the particle attribute specifically includes a particle size, a particle emission rate, a particle emission amount, a particle motion direction, a particle location update time, a particle life cycle, and a particle appearance attribute;

in step S1, the rendering module 62 performs the 3D transformation. In this step, the 3D display related parameters are updated such as a model transformation parameter, a view transformation parameter, a projection transformation parameter, and a viewport transformation parameter, and the 3D transformation is performed based on the current basic visual effect control parameter and 3D transformation parameter, and thus the overall display effect of the wallpaper may be changed by updating these model parameters. As shown in FIG. 2, a screen is slid by a user (step S6) to update transformation parameters (step S7), and thereby the 3D transformation parameters (D0) are updated, which are then transferred to step S1 as input parameters, and thus the user interaction effect with overall viewpoint change is implemented through the 3D transformation of step S1;

in step S2, the rendering module 62 renders a background. In this step, a selected background picture is drawn. In order to ensure that particle elements can be displayed, it is necessary to ensure that the background is located behind all the particles in the Z-coordinate depth direction;

in step S3, the rendering module 62 renders the particles. In this step, the currently generated particles are drawn. At a certain moment, a certain amount of particles have different location attributes and appearance attributes, the update of which are controlled in steps S8, S9, S10 and S11, and in this step the particles are drawn based merely on the current attribute of each particle and related overall parameters;

in step S4, quitting and determining. In this step, it is determined to perform a next round of the rendering loop or quit the operation. If another wallpaper is set by the user or the operating system is powered off, step S5 is performed; otherwise, step S1 is returned to and a next round of the rendering loop is performed;

in step S5, ending operations such as resource release are completed.

Steps S0 to S5 provide main processes for generating the dynamic wallpaper in the embodiments of the present disclosure. An interaction process and a particle updating process of the interaction module 64 are introduced below.

Steps S6 and S7 correspond to the interaction process that the user slides the screen. When the user slides the screen left or right, the 3D transformation parameter (D0) is updated, and the rendering steps are performed through step S1 based on the updated 3D transformation parameter. This will change viewpoints of the background and the particle elements in the scene. As shown in FIGS. 3b and 3c, when the screen is slid by the user, a translational effect appears for the viewpoint. A right translation appears for the viewpoint in the scene in FIG. 3c compared to that in FIG. 3b.

As shown in FIG. 2, steps S8 and S9 correspond to the interaction process of a tapping action:
in step S8, the user taps the screen;
in step S9, the particle attribute is updated;
steps S10 and S11 correspond to the particle updating process over time:
in step S10, timing module performs timing;
in step S11, it is determined whether the update time is reached based on the timing result of the timing module, if so, step S9 is performed; otherwise, step S10 is returned to.

Steps S8 and S9 correspond to the interaction process of the tapping action, steps S10 and S11 correspond to the particle updating process over time, and the parameters updated in both of these two branch processes are input to step S9 to implement a particle attribute updating process. Step S9 is a core part to implement the dynamic effect of the particles, in which attribute update and life cycle of each of the particles are controlled. Step S8 is mainly used to implement a disturbance on the attribute (such as the particle location) in an area near a tapping position based on the user's tapping action on the screen, so as to achieve the interaction effect. The coordinate and the tap mark after the tapping action in step S8 are provided to step S9 as input parameters. Steps S10, S11 are mainly used to implement the update of the time parameter, and input the updated time parameter to step S9.

Step S9, which is the core part to implement the dynamic effect of the particles, is elaborated below. As shown in FIG. 4, the following processing is included.

In step S90, it is detected whether or not there is a tapping action on the screen, if so, step S91 is performed; otherwise, step S92 is performed;

in step S91, upon detection of the tapping action on the screen, a tap parameter is acquired, and a tap mark is removed, so as to prevent from repeatedly reading the next time;

in step S92, it is determined whether new particles have to be generated, if so, step S93 is performed; otherwise, step S94 is performed. When the dynamic wallpaper begins to run, there is no particle in the scene, and the particles are generated successively based on a certain emission rate over time. As shown in FIGS. 3a and 3b, FIG. 3a is a state of the particle after a short while of running, and there are a relatively small amount of particles at this moment; while FIG. 3b corresponds to a scene with a relatively large amount of particles when the particle amount becomes relatively stable. In addition, even though the particle amount becomes relatively stable, the particle amount in the scene changes dynamically. When the particles move into a deleting area, the particles are deleted (see steps S98, S99), and it is also needed to maintain stability of the particle amount through the determining step in step S92 now.

In step S93, an appropriate amount of particles are generated based on the current particle amount and the emission rate;

in step S94, it is determined whether all the particles are updated, if so, step S90 is performed; otherwise, step S95 is performed;

in step S95, each of the particles is updated based on the current time and its attribute value of currently updated particle. This is the reason why the input parameters are given in the above steps S10, S11;

in step S96, it is determined whether the current particles are located in a tap-affected area based on the record of step S91, if so, step S97 is performed; otherwise, step S98 is performed.

In step S97, a disturbance is performed based on the current particle locations (updated locations through step S95) and the tapping position recorded by the step S91. This is the reason why the input parameters are given in the above step S8. FIG. 5 is a schematic diagram illustrating a disturbance in an embodiment of the present disclosure. As shown in FIG. 5, after the tapping action is performed on the screen, points, such as A0, B0, C0, D0, adjacent to a current tap point O (this point may be obtained by mapping from a 2D coordinate on the screen to a 3D space) spread outwards to A1, B1, C1, D1, respectively, centred at the point O.

In step S98, it is determined whether the current particles are located in the deleting area, if so, step S99 is performed; otherwise, step S94 is performed and other particles are updated. A definition mode of the deleting area is flexible, and one mode is that: if Z coordinate of the particle in the depth direction exceeds a certain value, then it is determined the particle is located in the deleting area.

In step S99, the particles located in the deleting area are deleted, the particle amount is updated, and then step 94 is performed and other particles are updated.

The technical solutions in the embodiments of the present disclosure provide a dynamic wallpaper with particular dynamic interaction effect through re-rendering the background and the particles in the dynamic wallpaper based on the updated 3D transformation parameter and basic visual effect control parameter upon the detection of the user's touching action on the screen. The dynamic wallpaper generated according to the embodiments of the present disclosure can provide people with an intuitive effect of 3D depth motion particles and an interaction enjoyment, and have unique features in terms of user experience such as visual effect and interaction effect compared to existing static wallpapers and dynamic wallpapers.

Although the preferred embodiments of the present disclosure have been disclosed for the purpose of demonstration, it will be realized that various improvements, additions, and replacements are possible for those skilled in the art. Therefore, the protection scope of the present disclosure is not intended to limited to the above embodiments.

The invention claimed is:

1. A method for generating a dynamic wallpaper, comprising:
   initializing a basic visual effect control parameter, wherein the basic visual effect control parameter comprises: an initial depth area, a particle attribute, and a disappearing depth area, wherein the particle attribute comprises: a particle size, a particle emission rate, a particle emission amount, a particle motion direction, a particle location update time, a particle life cycle, and a particle appearance attribute;
   setting a 3D transformation parameter, wherein the 3D transformation parameter comprises: a model transformation parameter, a view transformation parameter, a projection transformation parameter, and a viewport transformation parameter;
   rendering a background and particles based on the 3D transformation parameter and the basic visual effect control parameter to generate a dynamic wallpaper;
   upon detection of a user's touch action on a screen, updating the 3D transformation parameter and the basic visual effect control parameter based on a touch mode and a touch position; and
   re-rendering the background and the particles in the dynamic wallpaper based on the updated 3D transformation parameter and basic visual effect control parameter;

wherein the rendering a background and particles based on the 3D transformation parameter and the basic visual effect control parameter comprises:
  performing a 3D transformation on the background based on the 3D transformation parameter to acquire a 3D background and display the 3D background;
  rendering from the initial depth area, on the displayed 3D background, the particles with a motion direction and an initial rate according to the particle emission rate and the particle emission amount, based on the 3D transformation parameter and the basic visual effect control parameter;
  updating a location and an appearance of each of the particles based on the particle location update time and the particle appearance attribute;
  causing the particles located at the disappearing depth area to disappear; and
  restarting, for the disappeared particles, a next round of 3D depth motion from the initial depth area.

2. The method according to claim 1, wherein the upon detection of a user's touch action on a screen, updating the 3D transformation parameter and the basic visual effect control parameter based on a touch mode and a touch position, and re-rendering the background and the particles in the dynamic wallpaper based on the updated 3D transformation parameter and basic visual effect control parameter comprises:
  upon detection of a user's sliding action on the screen, updating the 3D transformation parameter based on a sliding position; and
  re-rendering the background and the particles based on the updated 3D transformation parameter to change viewpoints of the background and the particles based on the sliding position.

3. The method according to claim 1, wherein the upon detection of a user's touch action on a screen, updating the 3D transformation parameter and the basic visual effect control parameter based on a touch mode and a touch position, and re-rendering the background and the particles in the dynamic wallpaper based on the updated 3D transformation parameter and basic visual effect control parameter comprises:
  upon detection of the user's tapping action on the screen, updating the basic visual effect control parameter;
  re-rendering the particles based on the updated basic visual effect control parameter; and
  causing each of the particles currently on the screen to change its location based on a relative relation between the current location of the particle and a tapping position, such that the particles within a circle which has a certain radius and is centred at the tapping position move outwards, and the particles outside the circle move in their respective original trajectories.

4. The method according to claim 3, wherein the upon detection of the user's tapping action on the screen, updating the basic visual effect control parameter, re-rendering the particles based on the updated basic visual effect control parameter comprises:
  detecting whether there is a user's tapping action on the screen, if so, acquiring a tap parameter, and removing a tap mark;
  determining, after the tap mark is removed or the user's tapping action on the screen is not detected, whether new particles have to be generated based on the particle emission amount, if so, generating new particles;
  determining, whether all the particles are updated, if so, re-detecting whether there is a user's tapping action on the screen; otherwise,
  updating each particle based on the particle location update time,
  determining the particles within the circle which has a certain radius and is centred at the tapping position based on the tap parameter,
  updating the basic visual effect control parameter, and
  causing the particles within the circle which has a certain radius and is centred at the tapping position to move outwards based on the updated basic visual effect control parameter;
  determining, whether there is any particle located in the disappearing depth area, if so, deleting the particles located in the disappearing depth area, and re-determining whether all the particles are updated; otherwise, re-determining whether all the particles are updated directly.

5. An apparatus for generating a dynamic wallpaper, comprising:
  an initializing module configured to initialize a basic visual effect control parameter, and set a 3D transformation parameter,
  wherein the basic visual effect control parameter comprises: an initial depth area, a particle attribute, and a disappearing depth area, wherein the particle attribute comprises: a particle size, a particle emission rate, a particle emission amount, a particle motion direction, a particle location update time, a particle life cycle, and a particle appearance attribute;
  wherein the 3D transformation parameter comprises: a model transformation parameter, a view transformation parameter, a projection transformation parameter, and a viewport transformation parameter;
  a rendering module configured to render a background and particles based on the 3D transformation parameter and the basic visual effect control parameter to generate a dynamic wallpaper; and
  an interaction module configured to, upon detection of a user's touch action on a screen, update the 3D transformation parameter and the basic visual effect control parameter based on a touch mode and a touch position, and re-render the background and the particles in the dynamic wallpaper based on the updated 3D transformation parameter and basic visual effect control parameter;
  wherein the rendering module is configured to:
    perform a 3D transformation on the background based on the 3D transformation parameter to acquire a 3D background and display the 3D background;
    render from the initial depth area, on the displayed 3D background, the particles with a motion direction and an initial rate according to the particle emission rate and the particle emission amount, based on the 3D transformation parameter and the basic visual effect control parameter;
    update a location and an appearance of each of the particles based on the particle location update time and the particle appearance attribute;
    cause the particles located at the disappearing depth area to disappear; and
    restart, for the disappeared particles, a next round of 3D depth motion from the initial depth area;
  wherein the initializing module, the rendering module and the interaction module are each the result of execution on a processor of instructions stored in a memory.

6. The apparatus according to claim 5, wherein the interaction module is configured to:

update, upon detection of a user's sliding action on the screen, the 3D transformation parameter based on a sliding position, and re-render the background and the particles based on the updated 3D transformation parameter to change viewpoints of the background and the particles based on the sliding position; and update, upon detection of the user's tapping action on the screen, the basic visual effect control parameter, re-render the particles based on the updated basic visual effect control parameter, and cause each of the particles currently on the screen to change its location based on a relative relation between the current location of the particle and a tapping position, such that the particles within a circle which has a certain radius and is centred at the tapping position move outwards, and the particles outside the circle move in their respective original trajectories.

* * * * *